United States Patent
Copeland et al.

(10) Patent No.: US 6,769,146 B2
(45) Date of Patent: Aug. 3, 2004

(54) TRANSPORTATION SEAT WITH RELEASE BARRIER FABRICS

(75) Inventors: Todd Copeland, Columbus, OH (US); Roy P. DeMott, Spartanburg, SC (US); Thomas E. Godfrey, Moore, SC (US); Masato Ishibashi, Dublin, OH (US); William C. Kimbrell, Jr., Spartanburg, SC (US); Samuel J. Lynn, Greenwood, SC (US); Patricia Scott, Galloway, OH (US)

(73) Assignees: Milliken & Company, Spartanburg, SC (US); Honda Motor Co., Ltd. (JP)

(*) Notice: Subject to any disclaimer, the term of this patent is extended or adjusted under 35 U.S.C. 154(b) by 3 days.

(21) Appl. No.: 10/337,937

(22) Filed: Jan. 7, 2003

(65) Prior Publication Data

US 2004/0128770 A1 Jul. 8, 2004

(51) Int. Cl.⁷ .............................. A47C 7/26; A47C 7/18
(52) U.S. Cl. ...................................... 5/653; 297/452.61
(58) Field of Search ................ 5/653, 652; 297/452.48, 297/452.58, 452.61

(56) References Cited

U.S. PATENT DOCUMENTS

| | | | |
|---|---|---|---|
| 2,227,212 A | 12/1940 | Beck | 154/2 |
| 3,244,571 A | 4/1966 | Weisman | 147/23 |
| 3,527,654 A | 9/1970 | Jones et al. | 117/66 |
| 3,557,039 A | 1/1971 | McIntyre et al. | 260/29.2 |
| 3,905,863 A * | 9/1975 | Ayers | 162/113 |
| 3,974,025 A * | 8/1976 | Ayers | 162/113 |
| 3,994,771 A * | 11/1976 | Morgan et al. | 162/113 |
| 4,219,605 A | 8/1980 | Rohringer | 428/289 |
| 4,232,087 A | 11/1980 | Trask | 428/389 |
| 4,256,459 A | 3/1981 | Russell et al. | 8/471 |
| 4,265,962 A | 5/1981 | May | 428/290 |
| 4,291,082 A | 9/1981 | Stall | 428/138 |
| 4,355,065 A | 10/1982 | DeMott | 428/195 |
| 4,368,233 A | 1/1983 | Barkais et al. | 428/245 |
| 4,469,744 A | 9/1984 | Grot et al. | 428/246 |
| 4,525,409 A | 6/1985 | Elesh | 428/193 |
| 4,563,229 A | 1/1986 | Sorez | 156/64 |
| 4,610,918 A | 9/1986 | Effenberger et al. | 428/245 |
| 4,666,764 A | 5/1987 | Kobayshi et al. | 428/254 |
| 4,684,568 A | 8/1987 | Lou | 428/265 |
| 4,692,199 A | 9/1987 | Kozlowski | 156/245 |
| 4,861,409 A | 8/1989 | Hashida et al. | 156/308.2 |
| 4,919,998 A | 4/1990 | Goad et al. | 428/265 |
| 4,920,000 A * | 4/1990 | Green | 442/189 |
| 4,973,510 A | 11/1990 | Tanaka | 428/212 |
| 5,000,805 A | 3/1991 | Lowe | 156/90 |
| 5,024,875 A | 6/1991 | Hill et al. | 428/267 |
| 5,041,255 A * | 8/1991 | Zafiroglu | 264/288.8 |
| 5,045,375 A | 9/1991 | Davis et al. | 428/96 |
| 5,071,699 A | 12/1991 | Papas et al. | 428/265 |
| 5,094,883 A * | 3/1992 | Muzzy et al. | 427/185 |
| 5,126,138 A | 6/1992 | McGee et al. | 424/404 |
| 5,171,630 A * | 12/1992 | Muzzy et al. | 428/298.7 |
| 5,198,281 A * | 3/1993 | Muzzy et al. | 428/102 |
| 5,296,064 A * | 3/1994 | Muzzy et al. | 156/180 |
| 5,302,419 A * | 4/1994 | Muzzy | 427/485 |
| 5,360,661 A * | 11/1994 | Muzzy | 442/254 |

(List continued on next page.)

Primary Examiner—Robert G. Santos
(74) Attorney, Agent, or Firm—Terry T. Moyer; Jeffery E. Bacon; Mark Duell

(57) ABSTRACT

A fabric having a unique combination of stain resistance, fluid barrier properties, aesthetic characteristics and drape ability is described, and a method of making such fabrics. The fabric includes a fabric substrate that has been treated with a low surface energy stain resist compound on at least one of its surfaces, and one or more layers secured to the other of its surfaces, with the layers providing the fabric with the unique combination of characteristics. In addition, the fabric is desirably provided with flame resisting and ultraviolet resisting characteristics, to enable it to be used as a seating material for transportation vehicles. Methods for making the fabric are also described.

30 Claims, 1 Drawing Sheet

U.S. PATENT DOCUMENTS

| | | | |
|---|---|---|---|
| 5,389,430 A | | 2/1995 | Yilgor et al. ................ 428/246 |
| 5,409,757 A | * | 4/1995 | Muzzy et al. ................ 428/114 |
| 5,491,021 A | | 2/1996 | Tolliver et al. ............. 428/217 |
| 5,531,927 A | | 7/1996 | Peters ........................ 510/281 |
| 5,565,265 A | | 10/1996 | Rubin et al. ................ 428/265 |
| 5,635,290 A | * | 6/1997 | Stopper et al. ............. 428/198 |
| 5,645,892 A | | 7/1997 | Whitley et al. .......... 427/393.4 |
| 5,654,068 A | | 8/1997 | Pechhold ................... 252/8.62 |
| 5,684,052 A | | 11/1997 | Krishnan et al. .......... 521/40.5 |
| 5,747,392 A | | 5/1998 | Xiao et al. .................... 442/82 |
| 5,858,504 A | * | 1/1999 | Fitting ........................ 428/131 |
| 5,874,148 A | | 2/1999 | Hough et al. .................. 428/95 |
| 5,899,783 A | | 5/1999 | Kimbrell, Jr. et al. ........ 442/62 |
| 5,992,185 A | | 11/1999 | Leeke et al. .................. 66/170 |
| 6,024,823 A | | 2/2000 | Rubin et al. ................ 156/278 |
| 6,103,647 A | * | 8/2000 | Shultz et al. ............... 442/346 |
| 6,136,730 A | | 10/2000 | Kimbrell, Jr. et al. ........ 442/62 |
| 6,267,252 B1 | * | 7/2001 | Amsler ....................... 210/490 |
| 6,368,609 B1 | * | 4/2002 | Fontenot et al. ............ 424/404 |
| 6,479,061 B2 | * | 11/2002 | Fontenot et al. ............ 424/404 |
| 2003/0124928 A1 | * | 7/2003 | Sherrod et al. ............... 442/76 |

* cited by examiner

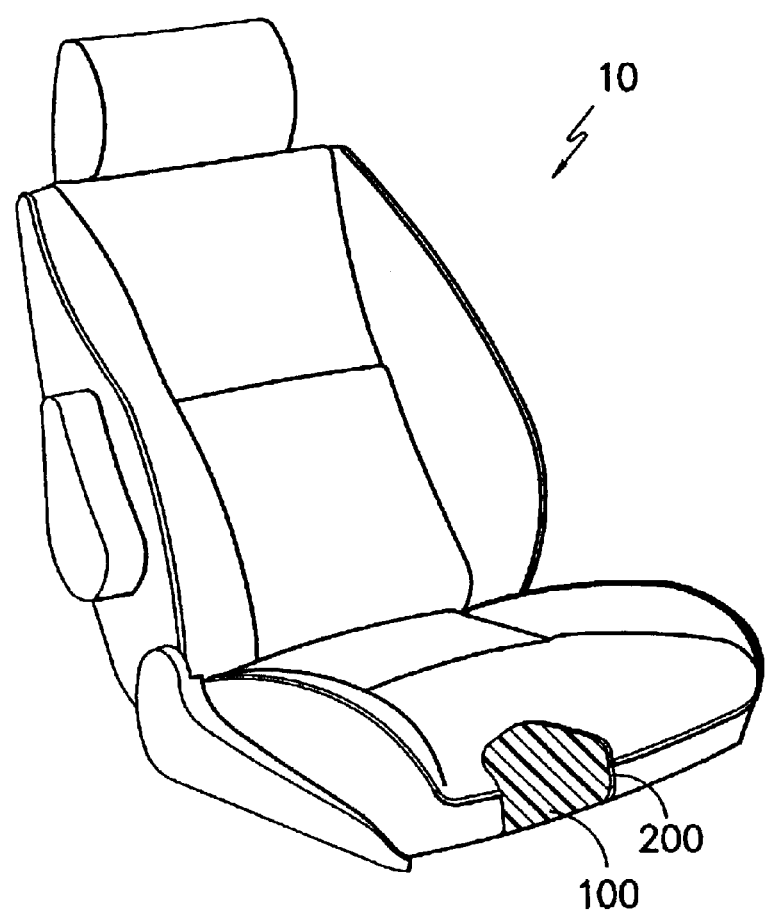
FIG. −1−

TRANSPORTATION SEAT WITH RELEASE BARRIER FABRICS

BACKGROUND

Traditional cars, which are typically used for family type transportation, require an interior fabric that has pleasing aesthetics. Traditional trucks and sport utility vehicles, which are typically used for industrial work and weekend outdoor sports activities, require an interior fabric that is durable to abrasion and extensive use, and that resists soiling and water. Recent trends have been to use a hybrid of traditional cars, trucks, and sport utility vehicles. The hybrid transportation vehicles are used not only for the family type transportation, but also for industrial and outdoor sport activities of the traditional trucks and sport utility vehicles. Additionally, fabrics for use in transportation vehicles must meet stringent requirements, such as flame resistance. Therefore, there is a need for textiles to be used in the interior of transportation vehicles, that not only have the pleasing aesthetics necessary for traditional cars but also the durability and soil and water resistance required of the traditional sport utility vehicle.

Heretofore, a number of approaches have been taken to making fabrics both cleanable and liquid resistant so as to be more useful in environments where liquid staining is likely to occur. Vinyl coated fabrics have been most broadly accepted for these purposes due to relatively easy cleanability and fairly low cost. These fabrics are generally manufactured by applying a coating of vinyl to an open scrim-type fabric, with the vinyl surface forming the outer or user-contacting surface. However, such vinyl coated fabrics are typically rather stiff to the touch and thereby lack the desired appearance and feel for use in environments such as automobiles, restaurants, nursing homes, and the like where pleasing tactile and visual perceptions by the user are considered important. Furthermore, the vinyl can tend to be uncomfortable against a user's skin, and since it forms a continuous, non-breathable surface, it can cause the build up of perspiration between the wearer and a seat. In addition, the vinyl surface can get extremely hot, and can be uncomfortable or even painful to sit on in some circumstances.

Surface laminated fabrics have been utilized to enhance the aesthetic characteristics of the fabrics, but due to the generally disjunctive adherence between the laminate film and the fabric itself, these products tend to peel, crack, and delaminate after long periods of use. Such laminated products also tend to lack the generally desirable feel of standard upholstery products. Additionally, adherence of a liquid barrier film or coating to a fabric substrate is made all the more difficult when fluorochemical stain-resist treatments are applied, since such compositions by their nature tend to repel an applied coating.

While overcoming many of the disadvantages of the prior art materials described above, it has been found that the fabrics produced by the current methods may be less flexible and pliable than what would be optimal for some end use applications, and in particular, those applications such as intricately-shaped transportation vehicle seating configurations or the like. While discussed in some respects above as relating to automobiles and trucks, as used herein, the term "transportation vehicle seating" is intending to encompass seating or other surface areas of all types of vehicles, including but not limited to boats, airplanes, helicopters, bicycles and motorbikes, trains, machinery such as tractors, bulldozers, and the like.

Therefore, there remains a need for fabrics that are both cleanable and liquid resistant, have good fire resistance characteristics to enable them to be used in transportation vehicle type end uses, and which have good aesthetic charactistics, including good flexibility. There also remains a need for transportation seats having a cover fabric thereon with such characteristics.

SUMMARY

In light of the foregoing, it is a general object of the present invention to provide a fabric which can be used for seating in transportation vehicles, which has pleasing aesthetics of the variety desired for family type transportation vehicles in combination with the durability and soil and water resistance generally desired for the traditional sporty utility vehicle, and also desirably has flame resistance and UV fading resistance.

It is another object of the present invention to provide a fabric which possesses both stain resist and fluid barrier properties but which also exhibits good drape characteristics as in traditional untreated upholstery fabrics, where a good drape is understood to mean flexibility and/or lack of stiffness of the fabric.

It is yet another object of the invention to provide a method of making a fabric having the above-stated characteristics in an economical and efficient manner.

It is also an object of the present invention to procide a transportation seat having a fabric with the above-referenced characteristics.

To this end, this invention provides a fabric having, and a trasportation seat with fabric having, a unique combination of stain resistance and fluid barrier properties, while having drape characteristics more comparable to conventional untreated fabrics. In this way, the fabric is not only comfortable when used to form occupant support surfaces, but the fabric can also be used for applications such as intricately configured seating configurations. In addition, the fabric also desirably has high levels of UV fading resistance and flame resistance, and forms a good bond with conventional seating foam materials, such that the fabric is particularly useful in the manufacture of automotive seating.

Furthermore, the fabric is capable of receiving additional materials such as antistats, antimicrobials, and the like to provide it with additional performance characteristics as desired. The fabric can be made by providing a textile fabric substrate that has been treated with a low surface energy stain resistance compound, and applying at least one layer of material, and preferably two or more layers, to the fabric substrate, with the layer(s) of material cooperating with the fabric substrate to provide a fabric having a bond strength of at least about 0.55 lbs/in$^2$ when tested according to ASTM D751 (2001) and preferably about 1 lbs/in$^2$ or greater, a hydrostatic pressure resistance of at least about 50 mb and more preferably at least about 100 mb, and a oil rating of about 3 or greater when tested according to AATCC Test Method 118-1997. Preferably, the fabric also has a burn rate of less than 4 inches and a ΔE of about 4.0 or less at 225 kj, as determined by SAE J1885 MAR92 (evidencing its good UV fade resistance.)

In one embodiment of the method, a low surface energy stain resistance compound is provided on at least one surface of the fabric, and stabilization material such as an acrylic material is applied to the other of its surfaces. An adhesive material is applied to the stabilization material, with the adhesive material in turn serving to bond a barrier material to the structure. In an alternative embodiment, the stabilization layer is omitted, and an FR additive can be included in the barrier material and/or the adhesive material to enable the fabric to achieve automotive industry flame standards.

BRIEF DESCRIPTION OF THE DRAWINGS

The present invention can be better understood with reference to the drawings, were:

FIG. 1 is a perspective partial cross-sectional view of a transportation seat incorporating the present invention.

DETAILED DESCRIPTION

In the following detailed description of the invention, specific preferred embodiments of the invention are described to enable a full and complete understanding of the invention. It will be recognized that it is not intended to limit the invention to the particular preferred embodiment described, and although specific terms are employed in describing the invention, such terms are used in a descriptive sense for the purpose of illustration and not for the purpose of limitation.

The present invention overcomes the disadvantages of conventional fabrics and in particular, conventional transportation vehicle fabrics, by providing a fabric that has the feel and drape (as indicated by flexibility/pliability) of a textile fabric, while having good cleanability, fluid barrier characteristics, fire resistance characteristics, and durability. In addition, the invention describes a method for making such fabrics in an efficient and economical manner. Furthermore, the fabrics of the invention can be produced to include additional characteristics such as UV resistance, antimicrobial agents, and the like.

The fabric of the invention desirably has a fabric substrate that has been chemically treated with a low surface energy stain resist compound, such as a flurorchemical, and one or more additional layers that provide the fabric with a unique combination of cleanability, fluid barrier characteristics, fire resistance, flexibility and durability. In one embodiment of the invention particularly preferred for use in transportation vehicle seating end uses and the like, the fabric also has UV fading resistance capabilities. Preferably, the fabric has good cleanability, as indicated by an oil rating of at least about 3 or greater when tested according to AATCCC Test Method 118-1997, a hydrostatic pressure resistance of about 50 or greater, and preferably about 100 or greater, when tested according to AATCC Test Method 127-1998, a burn rate of less than about 4 in/min when tested according to FMVSS-302 (Federal Motor Vehicle Safety Standard), and a bond strength of about 0.55 lbs/in$^2$ or greater when tested according to ASTM D751. Particularly preferred for this application are fabrics having an oil rating of about 4 or greater, and more preferably about 5.

As noted, the fabric desirably has good fluid barrier characteristics. To this end, the fabric desirably has a hydrostatic pressure of at least about 50 mb when tested according to AATCC Test Method 127-1998, and more preferably about 100 mbor greater, even more preferably about 125 mbor greater, and even more preferably about 150 mbor greater. In a particularly preferred form of the invention, the fabric has a hydrostatic resistance of about 200 or greater. In addition, the fabric also desirably has a Spray Rating of at least about 70 when tested according to AATCC Test Method 22-1996, and more preferably at least about 75, and even more preferably at least about 80. In this way, the fabric is enabled to perform well in end uses such as the above-described automotive seating for hybrid transportation vehicles, since the fabric will withstand spills, and can be hosed off in the event it does come into contact with dirt, food, or the like.

In another aspect of the invention, the fabric desirably has good flame resistance characteristics. Current government standards dictate that materials to be used in automotive interior applications have a bum rate of less than 4 inches per minute. Fabrics made according to the present invention can be produced to achieve and even exceed this level of fire resistance. In one embodiment of the invention, the fabric has a bum rate of less than 4 inches per minute in each of the lengthwise and crosswise directions, and even more preferably, less than about 3 inches per minute in each direction, and even more preferably, less than about 2 inches per minute in each direction. Also in embodiments of the instant invention, fabrics can be produced having fire resistance of less than about 1 inch per minute in each of the lengthwise and crosswise directions, and in some cases, may be self extinguishing in one or both directions.

The fabric also desirably has good stability, and resists delamination and peeling. It is believed that this high bond strength enables the fabric to achieve washability superior to that achieved by conventional types of barrier fabrics. By "washability", it is meant that the fabric is capable of withstanding laundering in conventional washing machines under home laundering detergent and temperature environments, and more preferably under industrial conditions, which as will be appreciated by those of ordinary skill in the art, expose the fabrics to more severe temperatures and/or detergents. Furthermore, the fabric is desirably capable of forming a strong bond with conventional seat fabric backing materials, such as polyurethane foams. As will be readily appreciated by those of ordinary skill in the art, such foams are commonly provided on the back of seating type materials so provide additional cushioning and to assist in protecting a user of the seat from the seat-forming parts, such as springs. The fabric desirably has a bond strength of at least about 0.55 lbs/in$^2$, and more preferably at least about 0.75 lbs/in$^2$ when secured to a polyurethane foam of the variety commonly used as a seat material backing, when tested according to ASTM D751 (2001). This indicates that the fabric's structure is strongly bonded together, and the foam is strongly bonded to the fabric. Even more preferably, the foamed fabric has a bond strength of about 1 lbs/in$^2$ or greater, and even more preferably about 1.1 lbs/in$^2$ or greater. As will be readily appreciated by those of ordinary skill in the art, transportation vehicle manufacturers generally require overall bond strength of at least 0.55 lbs/in$^2$; therefore, the high bond strength achievable by the fabric of the instant invention enables it to be used in the manufacture of transportation vehicle seating.

The fabric of the invention also desirably has good flexibility characteristics, which contribute to its superior aesthetic characteristics as opposed to prior barrier type fabrics. In particular, the fabric desirably has a bending length stiffness of about 120 mm or less according the test in ASTM D 1399 (1966), Test Method for Stiffness of Fabrics, Option A, and even more preferably about 100 mm or less in each of the lengthwise and crosswise directions, both when the fabric is face up and face down. Even more preferably, the fabric has a bending length stiffness of less than about 80 mm, and even more preferably less than about 60 mm, when tested in a face up orientation. As will be appreciated by those of ordinary skill in the art, the good flexibility not only facilitates the use of the fabric in the production of shaped-type articles, but it enhances the comfort of items such as seating. Furthermore, the ability of the fabric to drape well facilitates the application of a foam backing or other additional material as desired. In addition, the fabric can have additional properties through the inclusion of additional compounds such as antimicrobial agents, antistats, etc. These can be applied within any of the other layers or as a separate operation.

As noted above, the fabric of the invention has a unique combination of characteristics including cleanability, fluid barrier capabilities, flame resistance and flexibility. To this end, the fabric includes a fabric substrate having stain resistance characteristics. Preferably, the fabric substrate achieves this stain resistance by way of a low surface energy stain resist compound, such as a fluorochemical finish.

The fabric substrate can be formed in any known manner, including by weaving, knitting, braiding, nonwoven fabric manufacturing methods, thermobonding of fibers, or combinations thereof. For purposes of example, the fabrics discussed further herein are woven fabrics; however, it is noted that other types of fabrics can be used within the scope of the invention. Where a woven fabric is used, it is noted that the fabric can be plain woven, or can be woven to include a pattern, such as through a jacquard or dobby weaving method. In many forms of the invention, it will be desirable to use a relatively "closed" fabric construction, meaning that the fabric does not have large open areas between adjacent fibers and/or yarns which make up the fabric structure. As will be readily appreciated by those of ordinary skill in the art, such constructions can be achieved through the selection of the particular fabric construction method and set-up, and/or downstream processing methods such as thermal fixation or heat-setting. The fabric substrate can be of any weight desired for the particular end use application. Where the fabric is to be used in a transportation vehicle end use application, it has been found to be desirable to incorporate fabric substrates about 5 to about 16 oz/sq yd in weight, and more preferably about 8 oz/sq yd.

The fabric can be formed of any type of fibers and/or yarns, with the choice utilized being selected to optimize the fabric characteristics for the particular fabric and anticipated end use. For example, it has been found that solution dyed polyester yarns perform well in the fabrics of the invention. However, it is noted that other types of materials including but not limited to synthetic materials such as polyester, nylon, polypropylene, and acrylics, and natural materials such as cotton, wool, and the like, and blends thereof. Furthermore, the fabric substrate could comprise or consist essentially of pulp fibers, where so desired. Also, the yarn size can be selected to optimize the fabric for its particular end use. For example, large denier, fine denier, splittable fibers, microdenier fibers, spun or filament fibers, textured and flat fibers, and combinations thereof can all be used within the scope of the invention. Furthermore, the fabric can be a flat type fabric (such as a plain woven fabric) or a plush or pile fabric, or a suede type fabric. In certain embodiments of the invention, it has been found that fabric substrates having a hairy surface tend to have particularly desirable bond strength in the finished construction; such hairy surfaces are known in the art, and are achievable through such means as the inclusion of hairy yarns in the fabric structure, the mechanical or chemical abrasion of the yarns forming the fabric structure, or the like. For example, one type of yarn that has been found to perform well in the invention is an Albi-type textured yarn, which is a textured yarn having a hairy surface made up of a number of fibrils.

The fabric substrate preferably is colored, meaning that the color of the fabric has an L value of about 93 or less when analyzed using a Hunter Color Eye (such equipment being readily known by those of ordinary skill in the art.) In a preferred form of the invention, the fabric substrate will be colored due to its inclusion of solution dyed fibers and/or yarns such as solution dyed polyester, since such fibers have been found to provide desirable lightfastness and recyclability, or solution dyed nylon, which has good resistance to discoloration from contact with chlorine bleach. However, other methods of achieving a colored fabric substrate are also contemplated within the scope of the invention, including but not limited to the use of yarns dyed by other methods such as package dyeing, yarn dyeing, or the like, or dyeing of the fabric substrate by any discontinuous, continuous, or semi-continuous dye process including but not limited to piece dyeing, thermosol dyeing, jet dyeing, range dyeing, or the like. In addition, the fabric substrate could be printed or otherwise colored by any known method.

As noted, the fabric substrate desirably has stain resistance characteristics. To this end, the fabric substrate and/or components making up the fabric substrate can be treated with a stain resisting compound, such as a low surface energy stain resistance compound. Preferably, the stain resistance compound includes or consists essentially of a fluorochemical (and preferably, a highly durable, highly water and oil repellant fluorochemical), and the compound is applied to at least a first surface of the fabric substrate. For example, a low surface energy stain resist compound can be applied to the fabric by a process designed to retain the compound only on the surface to which it is applied (e.g. via certain foaming, roll application, spray methods, or the like), or the compound can be applied so as to affect both surfaces of the fabric, either through application to the complete fabric (e.g. via a pad application method) or by single-side application to both fabric substrate surfaces. Alternatively, the fabric can be manufactured from components that have been treated with a low surface energy stain resist compound, such as by applying the compound to the yarns prior to fabric formation. As noted above, the application of the low surface energy stain resisting compound will generally tend to decrease the ability of the fabric substrate to adhere to additional materials, and to increase flammability. However, this compound provides the material with good stain resisting and cleanability characteristics.

In one embodiment of the invention, the low surface energy stain resist compound-treated fabric substrate is then treated with a stabilization layer which is preferably a layer of a latex or solvent-borne polymer, plastisol, and/or or other polymer coating. Preferably the stabilization layer consists essentially of or includes an acrylic latex with a $T_g$ of less than about 10° C. In a particularly preferred form of the invention, this layer of acrylic will be flame resistant, either inherently or through the inclusion of flame resistant compounds. Suitable flame resistant compounds include, but are not limited to cyclic phoshonate, halogenated paraffin, brominated cyclic, or the like, or combinations thereof. This layer has been found to improve the dimensional stability of the fabric substrate, reduce pilling, and keep the component yarns and fibers from being readily pulled out from the fabric substrate, such as by snagging. Preferably, this layer is applied at a level of about 0.25 to about 7.5 oz/sq yd, and more preferably, at a level of about 2 oz/sq yd. Where the fabric substrate used is only treated on a single side with the low surface energy stain resist compound, the acrylic is desirably applied to the opposite surface of the fabric substrate. The acrylic can be applied in any known manner, including but not limited to coating methods, spray application, extrusion methods, roller or kiss-coating application methods, foaming, or the like. Preferably the stabilization layer is applied as a continuous layer, however, it can be provided in a discontinuous manner, such as a random or predetermined pattern, if so desired. Knife coating is a preferred application method in that it has been found to provide a good continuous coverage of the fabric substrate. The acrylic is desirably dried, preferably by processing it in a tenter at a temperature of about 3000° to about 400° F., and more preferably about 350° F.

In this embodiment of the invention, an adhesive material is then desirably applied to the stabilization material-treated fabric substrate. The adhesive is desirably a polymeric material which includes an elastic component. Examples of adhesive materials that can be used are metallocene polyethylene, acrylate polymers (such as methacrylate polymers), polyurethanes, polypropylene compositions, PET polyester compositions, polybutylene terephthalate (PBT) polyester compositions, elastomeric polyethylene, polyurethanes, elastomeric polyethylene, and combinations or blends thereof. In a particularly preferred form of this embodiment of the invention, the adhesive material is a metallocene polyethylene adhesive. The thickness at which the adhesive is applied and the application method used will be selected by the manufacturer depending on the type of equipment he wishes to use, the type of adhesive used, and the anticipated end use for the fabric, though it is expected that the thickness of the adhesive will generally be about 0.1 to about 5 mils, and more preferably from about 0.5 to about 3 mils. For this particular embodiment of the invention, it has been found that application of the metallocene by way of an extrusion coating process and at a thickness of about 1–2 mils produces a good product for use in transportation vehicle seating end uses.

A barrier material is then desirably applied to the adhesive material layer. Examples of barrier materials that can be used include, but are not limited to urethanes, polyesters, polyolefins, olefin copolymers, rubbers (natural and synthetic), silicones, polyvinylidene chloride, polyvinylidene fluoride, polyvinyl chloride, polyvinyl fluoride, plasticized versions thereof, and combinations or blends thereof. Preferably, the barrier material has a tensile modulus of less than that of the fabric, and is flexible, in order to maintain bond strength and resist delamination. In this particular embodiment of the invention, it has been found that a 1–2 mil polyester polyurethane or polyether polyurethane film laminated to the fabric structure by way of the metallocene polyethylene layer produces a desirable end product. Although lamination of a film is described in this embodiment, it is noted that other means of providing the layer of barrier material can be provided within the scope of the invention. For example, the barrier material can be applied by extrusion, coating methods, transfer methods, coating, spraying, foaming or the like. However, it has been found that the lamination of a polyurethane film provides a good continuous layer of the polyurethane on the fabric structure. The thickness of barrier material used can be selected according to the particular type of material used, the application method used, and the anticipated end use of the fabric. In this particular example of the invention, a polyurethane film having a thickness of about 0.25 to about 5 mils, and more preferably one having a thickness of about 1 to about 3 mils, has been found to perform well in the production of a fabric useful in the manufacture of transportation vehicle seating. In some embodiments of the invention, this barrier layer will also contain flame resistant compounds, as will be discussed further herein.

In certain embodiments of the invention designed for particular end uses, it may be desirable to apply a foam layer to the fabric. For example, in some seating type applications it is desirably to provide a foam layer to provide the fabric with additional cushioning capabilities and to shield the fabric from such things as springs and the like which form part of the seat support structure. In this form of the invention, it will be desirable to select an barrier material that is capable of bonding securely to the foam material. The above-described embodiment of the invention having a polyurethane film barrier layer has been found to bond well with conventional urethane foams of the variety commonly used to form automotive seating-type fabrics. The application of foam can be accomplished by a bonding method such as adhesive bonding or the like, or can be a lamination method such as flame lamination. However, other applications and securement methods for the foam can also be used within the scope of the invention.

The fabric described in this embodiment has good drape characteristics (as evidenced by its high level of flexibility/pliability), good fluid barrier properties, good stain resistance, flammability resistance and bond strength. In fact, as will be evidenced below in the Examples, the fabric made according to the instant invention has surprisingly been found to be capable of meeting or exceeding the rigorous standards required for automotive fabrics, at superior cleanability and aesthetic levels than heretofore achievable.

In an alternative form of the invention, a fabric substrate having a low surface energy stain resist treatment of the variety described previously is provided. In this embodiment of the invention, the step of applying an acrylic finish is eliminated, and the adhesive layer is applied to the fabric substrate itself. In this embodiment of the invention, the barrier material layer preferably includes an additive adapted to increase its flame resistance, in order to improve the flame resistance of the overall fabric. For example, the same base urethane as previously described can be used, with the urethane being modified to incorporate an effective amount of FR additive to enable the fabric to achieve particular levels of flame resistance needed for the anticipated end use for the fabric. Suitable flame retardant agents can include therein cyclic phoshonate, halogenated parafin, brominated cyclic, or the like. In a further alternative form of the invention, both the acrylic and adhesive layers are eliminated, and the elastic material layer is modified to include an effective amount of FR additive to enable it to achieve a desired level of flame resistance. However, in this embodiment, care must be taken to ensure that the favorable levels of flexibility and adhesion are maintained.

As noted previously, the fabric can include additional characteristics such as UV fading resistance, antimicrobial characteristics, antistatic characteristics, etc. UV fading resistance agents that have been found to perform well are benzotriazoles, modified triazine or the like, and it has been found that these can be applied simultaneously with the stain resistant compounds or as a separate operation.

Where antimicrobial features are desired, the antimicrobial agent can be placed onto at least the first side of the fabric substrate or both of fabric surfaces. The antimicrobial agent can be placed onto the first side of the fabric substrate by spraying, foam application, kiss-coat, or the like, or on both sides of the fabric substrate by immersion coating, padding, or the like. The antimicrobial agent can also be placed on the fabric substrate by exhausting the antimicrobial onto the fabric during the dye cycle. Additionally, the antimicrobial can be incorporated into the fibers forming the fabric substrate. As a further alternative, the antimicrobial materials can be provided in other of the material layers of the fabric, or as a separate independent layer. Suitable antimicrobials include, but are not limited to, silver, silicon quat, triclosan, and organotin. The antimicrobial can be applied at the effective minimum inhibiting concentration, such as at a level of 1.00% of DM-50, an antimicrobial commercially available from Thompson Research of Toronto, Canada. As will be appreciated by those of ordinary skill in the art, the inclusion of antimicrobials in the fabric may provide it with certain desirable characteristics such as mildew resistance, odor control, etc.

The antistatic agent can be placed onto at least the first side of the fabric substrate. The antistatic agent can be placed onto the first side of the fabric substrate by spraying, foam application, kiss-coat, or the like, or on both sides of the fabric substrate by immersion coating, padding, or the like. The antistatic agent can be placed on the fabric substrate with the low surface energy stain resist compound, or in a separate step with, or without, the other agents disposed on the fabric substrate. Suitable antistatic agents can include highly ethoxylated esters, quartenery ammonium compounds, or the like.

While prior discussion herein of the fluid barrier properties of the fabric have primarily focused on the liquid barrier capabilities thereof, it is to be noted that the fabric can also be used as a barrier to other fluids, such as air and/or other gases. This is evidenced by the Mullen Burst data described below, which is indicative of how well the fabric prevents the passage of air. While not wishing to be limited to one theory, it is believed that in part this superior air permeability may be attributable to the unique combination of coating and film utilized in some of the embodiments of the invention. In other words, it is the inventors' belief that the provision of a coating alone may leave poorly coated areas where a fibril or other three-dimensional protrusion exists on the fabric substrate. By providing a coating and a film combination such as that described in some embodiments of the invention, it is believed that the film serves to cover these areas of poor coating, thereby achieving a unique level of barrier properties.

These and other additives can be incorporated within one or more of the other layers, or applied as a separate operation, or provided on the original fabric substrate or as part of its original components (e.g. through the use of inherently antimicrobial or antistatic fibers.)

Although manufacture of the products has been described as encompassing the provision of several distinct layers, it is to be noted that the method of application can be varied to optimize manufacturing efficiencies, where possible. For example, multi-component films could be used to provide plural layers in a single operation (e.g. such as a bicomponent film having an adhesive already provided on a barrier film.)

Reflecting now to FIG. 1, there us shown a partial-cross section of a perspective view of a transportation seat 10 incorporating the present invention. The transportation seat 10, generally includes a resilient support cushion 100 with a fabric covering 200 thereon. The fabric covering 200 can incorporate all, or some of the features described above, and/or illustrated in the examples below.

A number of fabric samples for transportation seating were produced as follows: Samples were tested for a variety of characteristics, including fluid barrier properties (Hydrostatic Pressure Test and Spray Test), stain resistance (Oil Repellancy Test), flame resistance (Burn Rate, Burn Time and Char Length Tests), bond strength (Bond Strength Test), UV resistance (UV Test), thermal shock properties (Thermal Shock Test), and crocking (Colorfastness to Crocking Test).

Fluid Barrier Properties:

As used herein, the fluid barrier properties are determined by the American Association of Textile Chemists and Colorists (AATCC) Water Resistance: Hydrostatic Pressure Test Method 127-1998, and Water Repellency: Spray Test Method 22-1996, which are hereby incorporated herein in their entirety by specific reference thereto. The release barrier fabric of the present invention has a hydrostatic pressure resistance of about 50 millibars or greater as determined by AATCC Water Resistance: Hydrostatic Pressure Test TM 127-1998, and more preferably greater than about 100. Even more preferably, the fabrics have a hydrostatic pressure resistance of about 150 millibars or greater, and even more preferably about 200 millibars or greater. The release barrier fabric of the present invention has a water repellency rating of about 70 (IS04) or greater, as determined by the AATCC Water Repellency: Spray Test TM 22-1996.

Stain Resistance:

As used herein, the stain resistance properties are determined by AATCC Oil Repellency: Hydrocarbon Resistance Test Method 118-1997, which is hereby incorporated herein in its entirety by specific reference thereto. The stain resistance of the release barrier fabric of the present invention is about a Grade 3 or greater, as determined by the AATCC Oil Repellency: Hydrocarbon Resistance Test TM 118-1997, and more preferably, about a Grade 4 or greater. In certain embodiments of the invention, the oil resistance will be about 5 or greater, on up to the maximum rating of 8.

UV Resistance:

As used herein, the UV resistance properties are determined by SAE Recommended Practice SAE J1885 MAR92, Accelerated Exposure of Automotive Interior Trim Components Using A Controlled Irradiance Water Cooled Xenon-Arc Apparatus, which is hereby incorporated herein in its entirety by specific reference thereto. The UV resistance of the release barrier fabric of the present invention demonstrates a $\Delta E$ of about 4.0 or less at 225 kj, as determined by SAE J1885 MAR92.

Thermal Shock Properties:

As used herein, the thermal shock properties are determined by heating a fabric sample to about 100° C., applying the sample to a simulated body of predominately water at about 98° F., and measuring the temperature at the interface between the fabric sample and the simulated body after one second. The sample is approximately a 325 square inch piece of fabric mounted to a 3 mm thick polyurethane foam backing. The simulated body is approximately 25 pounds of water with an agar gel stabilizer, contained in a plastic bag. The temperature at the interface is measured by placing a thermocouple on the surface of the plastic bag. The release barrier fabric of the present invention experienced temperatures of about 35° C. or less after one second of contact with the simulated body.

Flame Resistance:

As used herein, the flame resistance properties are determined by FMVSS-302 Test Method, which is hereby incorporated herein in its entirety by specific reference thereto. The barrier fabrics of the invention, in some forms of the invention, desirably have a burn rate of about 4 inches or less, evidencing sufficient flame resistance to enable them to achieve current government flame resistance requirements for automotive interior fabrics. Where "SE" appears in the test results, it is to indicate that the fabric was self-extinguishing.

Crocking:

As used herein, the crocking properties are determined by AATCC Colorfastness to Crocking: AATCC Crockmeter Method TM 8-1996, which is hereby incorporated herein in its entirety by specific reference thereto. The crocking resistance of the release barrier fabric of the present invention is about a 3 or greater, as determined by the AATCC Colorfastness to Crocking: AATCC Crockmeter Method TM 8-1996.

Antistatic Properties:

As used herein, the antistatic properties are determined by AATCC Electrical Resistivity of Fabrics Test Method TM 76-1978, which is hereby incorporated herein in its entirety by specific reference thereto. The antistatic properties of the release barrier fabric of the present invention is about $10^{12}$ ohms per square or less, and preferably between about $10^{10}$ and about $10^{12}$ ohms per square, as determined by the AATCC Electrical Resistivity of Fabrics Test Method TM 76-1978.

Bending Length Stiffness:

As used herein, the bending length stiffness of the fabric is a measure of stiffness, where two equal and opposite forces are acting along parallel lines on either end of a strip of fabric bent into a curvature in the absence of tension, and is determined by ASTM D 1388 (1996), Standard Test Method for Stiffness of Fabrics, Option A.

Flexural Rigidity:

As used herein, the flexural rigidity of the fabric is an interaction between the fabric weight and fabric stiffness as shown by the way in which the fabric bends under its own weight, and is determined by ASTM D 1388 (1996), Standard Test Method for Stiffness of Fabrics, Option B.

Circular Bend Stiffness:

As used herein, the circular bend stiffness of the fabric is a measure of the resistance of the fabric to multidirectional bending, and is determined by ASTM D 4032 (1994), Standard Test Method for Stiffness of Fabric by the Circular Bend Procedure.

Bond Strength

Bond strength was tested according to ASTM D 751 (2001). Generally, a 0.55 or greater bond strength is required for automotive seating applications.

Mullen Burst

Sample F was tested according to ASTM D3786-87, with the fabric sample being used in place of the diaphragm conventionally used. This test method is incorporated herein by reference. The high values obtained indicate that the fabric will perform well as a barrier to gases such as air, and therefore will perform well in inflatable and other similar types of barrier end uses.

EXAMPLES

An approximately 8 oz/sq yd 100% polyester fabric having approximately 60 ends per inch and 45 picks per inch was used in each of the Samples A–G. The fabric was woven using 2 ply 150 filament textured polyester yarns in each of the warp and filling. The fabric was treated in a variety of different ways, as described below.

Sample A

An effective amount of fluorochemical finish was padded onto the fabric and the fabric was backcoated with a 1.5 mil coating of EMA (ethylene methyl acrylate) by extrusion coating. The fabric was tested for adhesion and burn according to the above-described test methods. Results of these tests are listed below in Tables A–C.

Sample B

An effective amount of a fluorochemical finish was padded onto the fabric in the same manner as with Sample A, and the fabric was backcoated with 1.5 mil coating of a polypropylene/polybutylene blend. The fabric was tested for adhesion and burn according to the above-described test methods. Results of these tests are listed below in Tables A–C.

Sample C

An effective amount of a fluorochemical finish was padded onto the fabric in the same manner as with Sample A, and the fabric was backcoated with a 1.5 mil coating of an ethylene methyl acrylate instead of the polypropylene/polyethylene used in Sample B. The sample was tested for adhesion and burn according to the above-described test methods. Results of these tests are listed below in Tables A–C.

Sample D

An effective amount of a fluorochemical finish was padded onto the fabric in the same manner as with Sample A, and the fabric was backcoated with an FR resistant acrylic backcoating at a rate of about 2 oz/sq yd. A 2 mil polyurethane film was laminated to the acrylic-coated surface of the fabric. The fabric was tested for bond strength, fluid barrier properties (spray test and hydrostatic pressure test), stain release and burn rate. The results are listed below in Tables A–C.

Sample E

An effective amount of a fluorochemical finish was padded onto the fabric in the same manner as with Sample A, and a 2 mil polyurethane film was laminated to the surface of the fabric in the manner of Sample D (though this time without the intermediate layer of acrylic). The fabric was tested for fluid barrier properties (spray test and hydrostatic pressure test), stain release and burn rate, but the fabric rolled up and could not be tested for bond strength. The results are listed below in Tables A–C.

Sample F

An effective amount of a fluorochemical finish was padded onto the fabric in the same manner as with Sample A, and an acrylic was coated onto the fabric at a level of 2 oz/sq yd. The fabric was dried, and then a metallocene adhesive was extrusion coated at 2 mils. A 2 mil film of polyether urethane (PT-5000, from Deerfield Urethane of South Deerfield, Mass. was laminated onto the fabric by way of the metallocene adhesive. The fabric was tested for stain resistance, fluid barrier properties, and flame resistance, and the results are listed below in Tables A–C. The fabric was also tested for Mullen Burst, with the results being listed below in Table D. (As indicated, eight different examples of two fabric samples were tested, with the results being averaged as indicated.)

Sample G

Sample G was manufactured in the same manner as Sample F, with the only difference being that a 1 mil polyester polyurethane film (PS-8010, also from Deerfield Urethane) was applied rather than the 2 mil film of polyether urethane. The fabric was tested for the same characteristics as Sample F, and the results are listed below in Tables A–D.

TABLE A

Bond Strength

| Sample | Bond Strength (lbs/in$^2$) |
|---|---|
| Sample A | 0.25 |
| Sample B | 0.31 |
| Sample C | 0.28 |
| Sample D | 1.1 |
| Sample E | 0.75 |
| Sample F | 1.1 |
| Sample G | 1.2 |

TABLE B

| Sample | Oil Rating | Spray Rating | Hydrostatic Pressure (mb) |
|---|---|---|---|
| Sample A | 4–5 | 50–70 | 55–60 |
| Sample B | 5–6 | 80–100 | 50–55 |
| Sample C | 5–6 | 80–100 | 50–55 |
| Sample D | 5 | 80 | 50 |
| Sample E | 5 | 100 | 55 |
| Sample F | 4 | 80 | 200 |
| Sample G | 5 | 80 | >200 |

TABLE C

| Sample | Char Length (in) Warp | Char Length (in) Filling | Burn Time (sec) Warp | Burn Time (sec) Filling | Burn Rate (in/min) Warp | Burn Rate (in/min) Filling |
|---|---|---|---|---|---|---|
| Sample A | 10 | >10 | 96 | 81 | 6.25 | >7.4 |
| Sample B | 8 | >10 | 98 | 90 | 4.9 | >6.7 |
| Sample C | 8 | >10 | 102 | 88 | 4.7 | >6.8 |
| Sample D | 0 | 0 | 0 | 0 | SE | SE |
| Sample E | 0 | 0 | 0 | 0 | SE | SE |
| Sample F | 1.6 | 3.4 | 25 | 105 | SE | 1.94 |
| Sample G | 0 | 2.6 | 0 | 93 | SE | 1.68 |

TABLE D

Mullen Burst

| | #1 | #2 | #3 | #4 | #5 | #6 | #7 | #8 | Avg. |
|---|---|---|---|---|---|---|---|---|---|
| Sample F | 58 | 48 | 57 | 57 | 49 | 67 | 57 | 50 | 55 |
| Sample G | 50 | 40 | 40 | 46 | 48 | 46 | 36 | 65 | 46 |

As shown by the above examples, the fabrics made according to the invention achieved a unique combination of bond strength of about 0.55 or greater, and hydrostatic resistance of about 50 or greater (and in fact, substantially higher.) In other words, the fabrics have unique combinations of durability and fluid barrier properties while retaining a superior level of drape than previously achievable. Furthermore, this was accomplished while achieving a high level of flame resistance, thereby enabling the fabrics to be used as seating fabrics in transportation vehicle end use applications.

Example H

A 3×3 twill fabric can be formed of 3/150 polyester warp yarns and 3/150 fill yarns with about 35 picks per inch and about 50 ends per inch. An effective amount of fluorochemical finish should be padded onto the fabric and the fabric is backcoated with about 65 g/m$^2$ of an acrylic latex by the knife coating method. A polyether polyurethane film of about 20 g/m$^2$ should also be bonded to the acrylic latex coated side of the fabric with about 10 g/m$^2$ of a low melt temperature copolyester adhesive which is activated by the application of heated rollers applied to the outside of the film. The weight of the finished fabric should be about 380 g/m$^2$. When the finish fabric can then be tested for bending length stiffness, flexural rigidity, and circular bend stiffness according to the above-described test methods, and the results should be about as listed in Tables E–G.

TABLE E

Bending Length Stiffness

| | Face Up | | Face Down | |
|---|---|---|---|---|
| Example | Warp Direction (mm) | Fill Direction (mm) | Warp Direction (mm) | Fill Direction (mm) |
| Example H | 120 | 92 | 51 | 53 |

TABLE F

Flexural Rigidity

| Example | Warp Direction | Fill Direction |
|---|---|---|
| Example H | 2.3 Inches | 2.8 Inches |

TABLE G

Circular Bend Stiffness

| | Face Up | | Face Down | |
|---|---|---|---|---|
| Sample | Peak Load (grams force) | Modulus (psi) | Peak Load (grams force) | Modulus psi |
| Example H | 4897 | 5.5 | 6515 | 10.5 |

As shown by Example H, the samples of the present invention can be formed with a bending length stiffness of about 120 mm or less, and other favorable stiffness and flexibility characteristics.

Although the fabrics of the invention have been described as having particular utility as transportation vehicle materials, it is noted that the fabrics would also have utility for other end uses. For these alternative end uses, it may be desirable to modify such things as the flame resistance, UV fading resistance, level of air permeability, bond strength, and the like in order to achieve a fabric particularly suited for the anticipated end use. For example, where the fabric is to be used as an outdoor fabric such as for outdoor furniture or awnings, it may be desirable for that fabric to have a resistance to UV fading of about 200 to 300 hours or greater, when tested according to AATCC Test Method 186-2000, under fluorescent light in a spray humidity environment. Similarly, such things as the level of antimicrobial resistance and flexibility may also be engineered to achieve an optimal end product for a particular end use.

In the specification there has been set forth a preferred embodiment of the invention, and although specific terms are employed, they are used in a generic and descriptive sense only and not for purpose of limitation, the scope of the invention being defined in the claims.

What is claimed is:

1. A transportation seat comprising:
   a resilient support cushion;
   a fabric covering disposed on the resilient supporting cushion, the fabric covering including:
      a fabric substrate including a low surface energy stain resisting compound;
      an adhesive layer secured to one surface of the fabric substrate; and
      a barrier layer secured to said adhesive layer; and,
   said fabric covering having a bending length stiffness of about 120 mm or less in each of a lengthwise and crosswise direction in each of face up and face down orientations when tested according to ASTM D 1399 (1966), Test Method for Stiffness of Fabrics, Option A, and a hydrostatic pressure resistance of about 50 mb or greater when tested according to AATCC test Method 127-1998.

2. The transportation seat according to claim 1, further comprising a stabilization layer between said fabric substrate and said adhesive layer.

3. The transportation seat according to claim 2, wherein said stabilization layer is a substantially continuous layer.

4. The transportation seat according to claim 2, wherein said stabilization layer comprises an acrylic material.

5. The transportation seat according to claim 1, wherein said fabric covering has a Mullen Burst strength of about 40 psi or greater.

6. The transportation seat according to claim 1, wherein said fabric covering has a Mullen Burst strength of about 50 psi or greater.

7. The transportation seat according to claim 1 wherein said fabric covering is bonded to a foam layer at a bond strength of about 0.55 lb/in$^2$ or greater when tested according to ASTM D751 (2001).

8. The transportation seat according to claim 1, wherein said fabric covering has a bending length stiffness of about 100 mm or less.

9. The transportation seat according to claim 1, wherein said fabric covering has a bending length stiffness of about 90 mm or less.

10. The transportation seat according to claim 1, wherein said fabric covering has a hydrostatic pressure resistance of about 100 mb or greater when tested according to AATCC Test Method 127-1998.

11. The transportation seat according to claim 1, wherein said fabric covering has a hydrostatic pressure resistance of about 150 mb or greater when tested according to AATCC Test Method 127-1998.

12. The transportation seat according to claim 1, wherein said fabric covering has a hydrostatic pressure resistance of about 200 mb or greater when tested according to AATCC Test Method 127-1998.

13. A transportation seat comprising:
   a resilient support cushion;
   a fabric covering disposed on the resilient cushion, the fabric covering including a textile substrate and one or more additional layers secured to one surface of said textile substrate, said fabric covering having a bending length stiffness of about 120 mm or less in each of a lengthwise and crosswise direction in each of face up and face down orientations according to ASTM D 1399 (1966), Test Method for Stiffness of Fabrics, Option A, and a hydrostatic pressure resistance of about 50 mb or greater when tested according to AATCC test Method 127-1998.

14. The transportation seat according to claim 13, wherein said fabric covering has a bending length stiffness of about 100 mm or less in each of the lengthwise and crosswise directions in each of a face up and face down orientations.

15. The transportation seat according to claim 13, wherein said fabric covering has a hydrostatic pressure resistance of about 100 mb or greater.

16. The transportation seat according to claim 13, wherein said fabric covering has a hydrostatic pressure resistance of about 150 mb or greater.

17. The transportation seat according to claim 13, wherein said fabric covering has a hydrostatic pressure resistance of about 200 mb or greater.

18. The transportation seat according to claim 13, wherein said fabric covering has a burn rate of about 4 inches or less when tested according to FMVSS-302 Test Method.

19. The transportation seat according to claim 13, wherein said fabric covering has a burn rate of about 3 inches or less when tested according to FMVSS-302 Test Method.

20. The transportation seat according to claim 13, wherein said fabric covering has a burn rate of about 2 inches or less when tested according to FMVSS-302 Test Method.

21. The transportation seat according to claim 13, wherein said fabric covering has a spray rating of about 70 or greater when tested according to AATCC Test Method 22-1996.

22. The transportation seat according to claim 13, wherein said fabric covering has a spray rating of about 80 or greater when tested according to AATCC Test Method 22-1996.

23. The transportation seat according to claim 13, wherein said fabric covering has an oil rating of about 3 or greater when tested according to AATCC Test Method 118-1997.

24. The transportation seat according to claim 13, wherein said fabric covering has an oil rating of about 4 or greater when tested according to AATCC Test Method 118-1997.

25. The transportation seat according to claim 13, wherein said fabric covering has an oil rating of about 5 or greater when tested according to AATCC Test Method 118-1997.

26. The transportation seat according to claim 13, wherein said fabric covering has a Mullen Burst strength of about 50 psi when tested according to ASTM D751 (2001).

27. The transportation seat according to claim 13, wherein said fabric covering has a burn rate of about 4 inches or less when tested according to FMVSS-302 Test Method, and said fabric substrate includes a low surface energy stain resisting compound.

28. The transportation seat according to claim 27, wherein said fabric covering forms a part of a transportation vehicle.

29. The transportation seat comprising:
   a resilient support cushion;
   a fabric covering disposed on the resilient supporting cushion, the fabric covering including a fabric substrate including a low surface energy stain resisting compound and at least one layer secured to one surface of said fabric, said fabric covering having a hydrostatic pressure resistance of at least about 125 mb when tested according to AATCC Test Method 127-1998 and a bending length stiffness of about 120 mm or less in each of a lengthwise and crosswise direction in each of face up and face down orientations according to ASTM D 1399 (1966), Test Method for Stiffness of Fabrics, Option A.

30. The transportation seat according to claim 29, wherein said fabric covering has a burn rate of about 4 inches or less when tested according to FMVSS-302 Test Method.

* * * * *